United States Patent [19]

Akachi et al.

[11] Patent Number: 4,937,980
[45] Date of Patent: Jul. 3, 1990

[54] DOOR WEATHER STRIP FOR MOTOR VEHICLE

[75] Inventors: Keiji Akachi, Gifu; Harumi Kogiso, Inazawa; Kazuo Ogawa, Ota; Nobuyuki Okada, Ota; Chieko Kawauchi, Ota, all of Japan

[73] Assignees: Toyoda Gosei Co., Ltd., Nishikasugai; Fuji Jukogyo Kabushiki Kaisha, Tokyo, both of Japan

[21] Appl. No.: 440,378

[22] Filed: Nov. 22, 1989

[30] Foreign Application Priority Data

Dec. 13, 1988 [JP] Japan .................... 63-161636[U]
Dec. 13, 1988 [JP] Japan .................... 63-161637[U]

[51] Int. Cl.⁵ .................................................... E06B 7/16
[52] U.S. Cl. ........................................ 49/475; 47/479; 292/DIG. 65
[58] Field of Search .................. 49/227, 377, 475, 479, 49/502, 503; 292/216, 280, DIG. 65

[56] References Cited

U.S. PATENT DOCUMENTS 4,662,115  5/1987  Ohya et al. .................. 49/503 X

FOREIGN PATENT DOCUMENTS 57-80562  5/1982  Japan .

*Primary Examiner*—Gary L. Smith
*Assistant Examiner*—Jerry Redman
*Attorney, Agent, or Firm*—Cushman, Darby & Cushman

[57] ABSTRACT

A door weather strip attached along a periphery of a rear door panel of a motor vehicle has a strip-shaped tubular main portion and a molded rear end portion connected to a rear end of the strip-shaped tubular main portion. The molded rear end portion is attached over a rear upper end portion of a door inner panel so as to cover a child lock lever hole formed in the rear upper end portion, and has an opening at the position corresponding to the child lock lever hole thereby enabling a child lock lever to slidably project therefrom.

5 Claims, 6 Drawing Sheets

DOOR WEATHER STRIP FOR MOTOR VEHICLE

BACKGROUND OF THE INVENTION

1. Field of the Invention

The present invention relates to a door weather strip for a motor vehicle, and more particularly to a door weather strip attached along an outer periphery of a door panel of a rear door provided with a child lock lever hole.

2. Description of the Prior Art

In many cases, a motor vehicle is provided with a child lock lever hole in a rear door for preventing a child on a rear seat from erroneously opening the rear door.

A (FIG. 1) child lock lever hole 4 is generally provided inside a rear upper portion A of a door panel 1 of a rear door.

As shown in FIGS. 8 and 9, a lock lever 5 projects from the child lock lever hole 4. By setting the lever 5 at its locking position, the rear door is prevented from being opened even when a child erroneously operates an inside handle.

Meanwhile, a door weather strip 7 is attached along an outer periphery of the door panel 1 of the rear door for effecting a seal between the outer periphery of the door panel 1, and a door opening of a vehicle body. A molded end portion 72 is formed at an end of the door weather strip 7 for covering a corner of a rear upper end portion of the door panel 1 of the rear door. In FIG. 8, reference numeral 10 designates a door inner panel, 11 designates a door outer panel, 2 designates a trim covering the door inner panel 10, and 3 designates a door glass.

In the above-described conventional construction, the child lock lever hole 4 is formed in the rear upper end portion of the door inner panel 10 below the molded end portion 72. This construction makes the appearances of the door inner panel 10 look unrefined. Moreover, a label 6 indicating the manipulation method of the lock lever 5 is ordinarily adhered to the door inner panel 10 near the hole 4 thereby making the appearance of the entire rear upper end portion of the rear door look less simple.

Additionally, in order to cover an opening edge of the hole 4, in this construction, a ring-shaped protector 8 made of rubber or the like is attached thereto. However, this protector 8 does not serve to significantly improve the appearance of the rear upper end portion of the door panel 1.

FIGS. 10 and 11 illustrate another conventional construction wherein the child lock lever hole 4 is formed in the door inner panel 10 below the molded end portion 72 of the door weather strip 7. And this hole 4 is covered with a film-shaped cover member 6 made of rubber or synthetic resin, which is fitted around an opening edge of the hole 4. A slit 42 is formed in the cover member 6, and a head portion of the lock lever 5 is projected from the slit 42 so as to be slidable therealong (Japanese unexamined utility model publication No. Sho57-80562).

This construction is advantageous in that rainwater and dust do not easily enter the child lock lever hole 4 when the rear door is opened, but the appearance of the rear upper end portion of the door panel 1 lacks simplicity and refinement. Additionally, the cover member 6 must be separately prepared and attached to the hole 4. These steps lower the work efficiency.

SUMMARY OF THE INVENTION

It is an object of the present invention to simplify the appearance of the rear upper end portion of a door panel of a rear door provided with a child lock lever hole, and covered with an end portion of a door weather strip, and make it look refined.

It is another object of the present invention to provide a door weather strip having an end portion which is effective in simplifying the appearance of the rear upper end portion of a door panel of a rear door provided with a child lock lever hole.

In order to achieve the above-described objects, in accordance with the present invention, a rear end portion of a door weather strip for a rear door is formed by molding to have such sizes as to cover a rear upper end portion of the door panel including a child lock lever hole formed therein, and an opening is formed in the rear end portion so that a head portion of a lock lever projecting from the child lock lever hole is slidably projected therefrom.

In accordance with the present invention, the child lock lever hole is positioned inside the rear end portion of the door weather strip so as to make the appearance of the rear upper end portion of the door panel of the rear door look simple and refined. And the manipulation method of the lock lever can be unevenly indicated on the surface of the rear end portion by molding letters or signals thereon.

Moreover, the child lock lever hole can be covered without steps of preparing and attaching a separate cover member.

BRIEF DESCRIPTION OF THE DRAWINGS

FIG. 1 is a side view of a motor vehicle on which the door weather strip of the present invention is mounted;

FIG. 2 is a perspective view of a molded end portion of the door weather strip;

FIG. 3 is a perspective view of a rear upper end portion of a door panel of a rear door to which the molded end portion is attached;

FIG. 4 is a sectional view taken along the line IV—IV of FIG. 3;

FIG. 5 is a perspective view of a molded end portion of the door weather strip;

FIG. 6 is a perspective view of a rear upper end portion of a door panel of a rear door to which the molded end portion is attached;

FIG. 7 is a sectional view taken along the line VII—VII of FIG. 6;

FIG. 8 is a perspective view of a rear upper end portion of a door panel of a rear door;

FIG. 9 is a sectional view taken along the line IX—IX of FIG. 8;

FIG. 10 is a perspective view of a rear upper end portion of a door panel of a rear door;

FIG. 11 is a sectional view taken along the line XI—XI of FIG. 10.

DETAILED DESCRIPTION OF THE EMBODIMENTS

Figure 1:
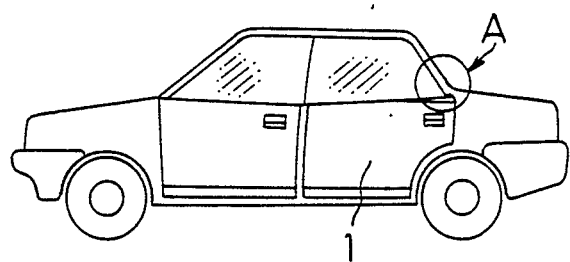
FIGS. 1 through 4 illustrate a first embodiment of a door weather strip according to the present invention.
Figure 2:
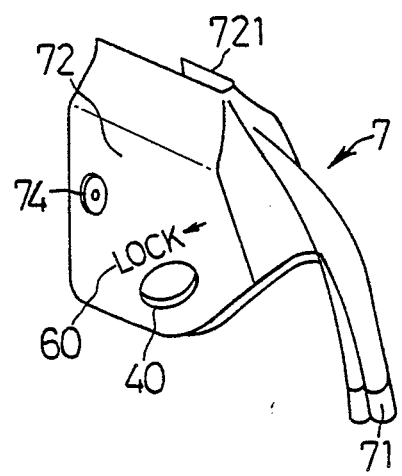

FIGS. 1 through 4 illustrate a first embodiment of the present invention.

A door weather strip 7 is attached along an outer periphery of a door panel 1 of a rear door of a motor vehicle. The door weather strip 7 is composed of a strip-shaped tubular extruded main portion 71 attached along the outer periphery of the door panel 1 of the rear door, and molded end portions 72 connected to respective ends of the extruded main portion 71. A lower end of the molded end portion 72 on the rear side has a sectional shape corresponding to that of a rear end of the extruded main portion 71, and is connected thereto. And the upper portion of the molded end portion 72 is formed into a plate shape to cover a corner of a rear upper end portion of a door inner panel 10 of the door panel 1, and the upper end thereof is formed into a U-shaped end portion 721 adapted for embracing a rear edge of a door glass 3.

In the door inner panel 10 of the door panel 1, an oval child lock lever hole 4 is formed near the rear upper corner thereof. A head portion of a lock lever 5 is projected from the child lock lever hole 4.

Figure 3:
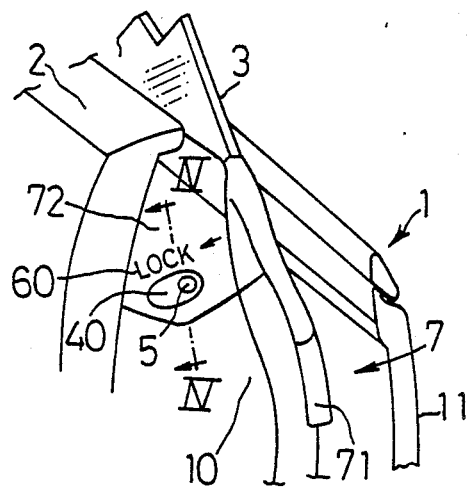
Figure 4:
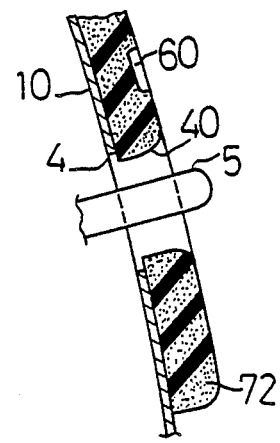

The molded end portion 72 has such sizes as to cover the child lock lever hole 4. An opening 40 having the same shape as that of the hole 4 is formed in the molded end portion 72. Above the opening 40, concave indications such as letters "LOCK" and an arrow showing the direction for manipulating the lever are die-molded at the same time with the die-molding of the molded end portion 72. The molded end portion 72 is secured to the door inner panel 10 of the door panel 1 in a hole 74 by means of clips or the like. In FIG. 3, reference numeral 11 designates a door outer panel, 2 designates a trim provided inside the door inner panel 10.

In the present embodiment, both the opening 40 for the hole 4, and the indications 60 are provided in the molded end portion 72 so that such opening and indications are not provided in the door inner panel below the molded end portion 72 thereby making the appearance of the panel portion of the rear door lock simple and refined.

Figure 5:
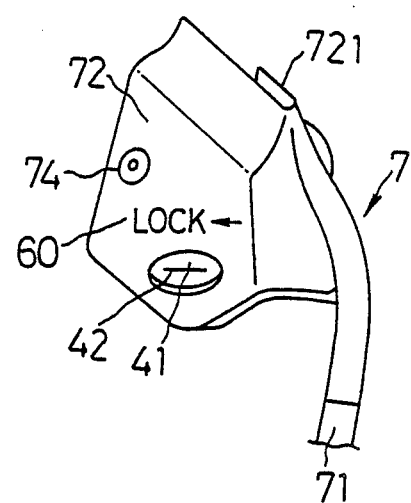
FIGS. 5 through 7 illustrate a second embodiment of a door weather strip according to the present invention.
Figure 6:
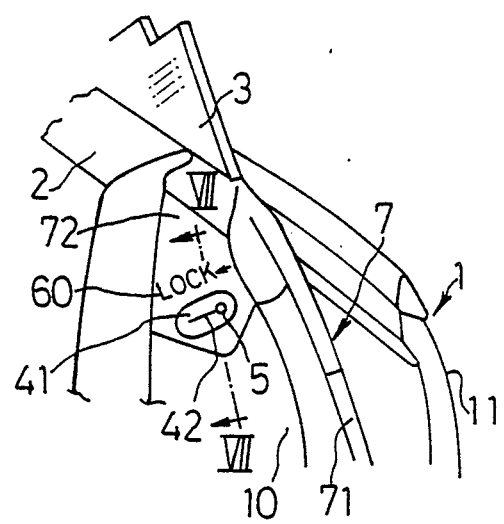
Figure 7:
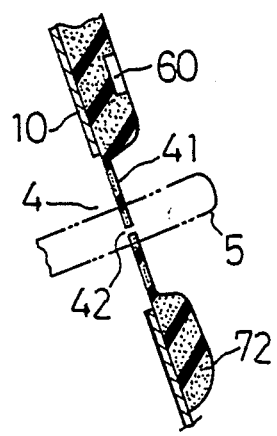
Figure 8:
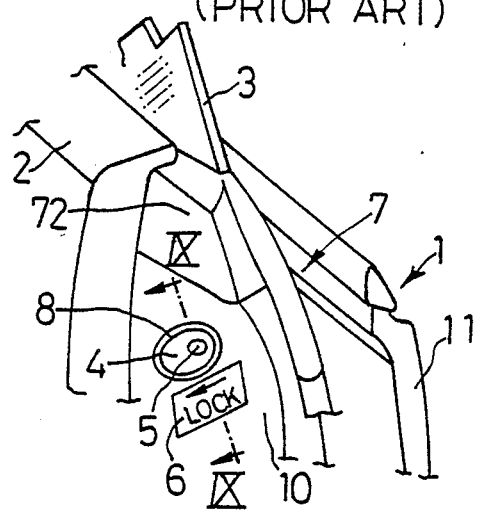
FIGS. 8 and 9 illustrate one conventional construction of a rear door.
Figure 9:
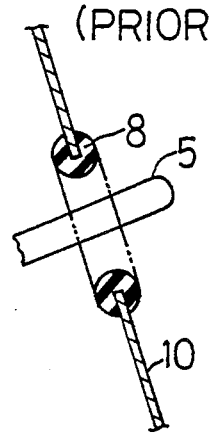
Figure 10:
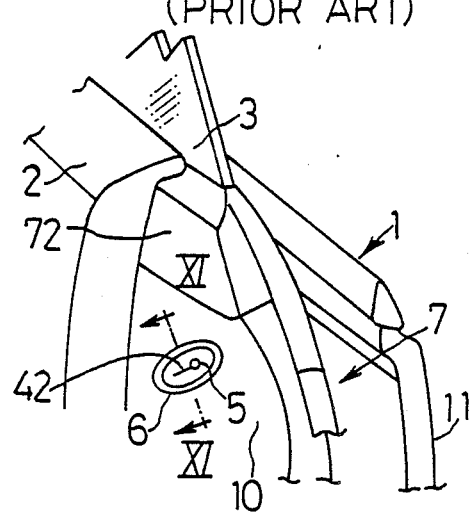
FIGS. 10 and 11 illustrate another conventional construction of a rear door.
Figure 11:
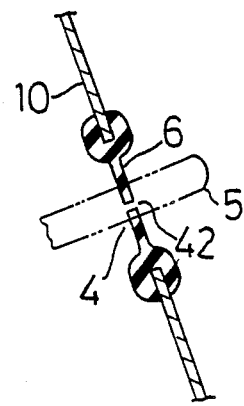

FIGS. 5 through 7 illustrate a second embodiment of the present invention.

The door weather strip 7 is attached along the door panel 1 of the rear door of the motor vehicle. The door weather strip 7 is composed of the strip-shaped tubular extruded main portion 71 and the molded end portions 72 similarly to the first embodiment.

In the molded end portion 72 on the rear side, a film portion 41 of the same shape as that of the hole 4 formed in the door inner panel 10, is formed at the position corresponding to the hole 4. And a slit 42 extending in a sliding direction of the lock lever 5 projecting rom the hole 4 is formed in the film portion 41. Additionally, concave indications 60 such as the letters "LOCK" and the arrow showing the manipulating direction of the lever 5 are formed above the film portion 41. These film portion 41 and the indications 60 are molded at the same time with the molding of the molded end portion 72. The other construction of the molded end portion 72 is substantially the same as that of the first embodiment.

The molded end portion 72 is secured to the door inner panel 10 in the hole 74 by means of clips or the like so that the head portion of the lock lever 5 is slidably projected from the slit 42 of the film portion 41.

In the door weather strip 7 of the present embodiment, the child lock lever hole 4 is covered with the film portion 41 formed in the molded end portion 72. This film portion 41 prevents rainwater and dust from entering the hole 4. This construction does not require the preparation of a separate cover member for the child lock lever hole 4 and the attaching of the same in the hole 4, and accordingly is extremely advantageous in both the production cost and the work efficiency. Moreover, the child lock lever hole 4 is covered with the molded end portion 72 so that the appearance of the rear end portion of the door panel 1 of the rear door becomes simpler and is made look more refined as compared with the conventional one.

What is claimed is:

1. A door weather strip to be continuously attached along an outer periphery of a door panel of a rear door of a motor vehicle, a door inner panel of which is provided with a child lock lever hole in its rear upper end portion, a head portion of a lock lever projecting from the child lock lever hole, comprising:
    a strip-shaped tubular main portion attached along the outer periphery of the door panel; and
    a rear end portion connected to a rear end of said strip-shaped tubular main portion for covering a rear upper end portion of the door inner panel, said rear end portion having such sizes as to cover the child lock lever hole, and being provided with an opening from which the head portion of the lock lever slidably projects, at a position corresponding to the child lock lever hole.

2. A door weather strip according to claim 1, wherein said opening of said rear end portion has the same shape as that of the child lock lever hole.

3. A door weather strip according to claim 1, wherein said rear end portion is provided with a film portion at a position corresponding to the child lock lever hole, and said opening is a slit extending in a sliding direction of the lock lever, which is formed in said film portion.

4. A door weather strip according to claim 1, wherein said strip-shaped tubular main portion is formed by extruding and said rear end portion is formed by molding.

5. A door weather strip according to claim 4, wherein said molded rear portion is provided with molded indications near said opening.

* * * * *